Nov. 26, 1935.  W. E. URSCHEL  2,021,970

FRUIT AND VEGETABLE PEELER

Filed April 20, 1931  2 Sheets-Sheet 1

INVENTOR.
William E. Urschel
BY
ATTORNEY

Nov. 26, 1935.　　　W. E. URSCHEL　　　2,021,970
FRUIT AND VEGETABLE PEELER
Filed April 20, 1931　　2 Sheets-Sheet 2

INVENTOR.
William E. Urschel
BY
ATTORNEY

Patented Nov. 26, 1935

2,021,970

UNITED STATES PATENT OFFICE 2,021,970

FRUIT AND VEGETABLE PEELER

William E. Urschel, Valparaiso, Ind.

Application April 20, 1931, Serial No. 531,306

13 Claims. (Cl. 146—50)

The present invention relates to peeling devices and has to do particularly with a type of peeler wherein the epidermis is removed by roughened surfaces.

The primary object of the invention is to produce a simple, durable machine employing burrs for the purpose of peeling vegetables and fruits.

Another object of the invention is to provide a machine that will peel the low spots of indentations in vegetables or fruits without removing an excess of the high points on the contour of such vegetables or fruits.

Another object of the invention is to produce a machine to peel vegetables and fruits of varying degrees of firmness without causing injury to said vegetables or fruits.

Another object of the invention is to produce a peeling machine that will simultaneously cleanse the vegetables and fruits during the peeling operation.

The character of the invention is fully pointed out in the following specification and one embodiment of the invention is illustrated in the accompanying drawings in which.

Like reference characters are used to designate similar parts in the drawings and in the description which follows.

Figure 1:
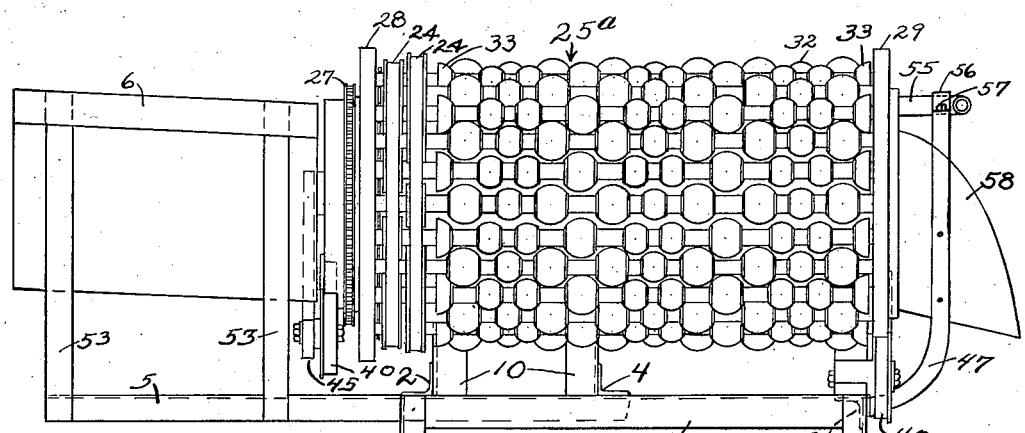
Figure 1 is a side elevation of the vegetable and fruit peeling machine embodying the invention.

The machine may be divided into three units for description, namely the frame, drive and peeling drum.

The frame of the machine consists of two parallel main longitudinal members 1 (see Figure 1) held in spaced relation by means of transverse end members 2 and 3 and intermediate transverse member 4. Secured to the transverse frame members 2 and 4 in parallelism to longitudinal frame members 1 and extending beyond member 2 toward the feed end of the machine are longitudinal frame members 5.

A conventional feed hopper 6 is secured to said longitudinal frame member 5 by means of hopper supporting member 53. The driving mechanism is secured to the main frame by supporting members 10 secured to transverse frame members 2 and 4. Leg members 7 are secured to the main frame members 1 and 3 and braced by diagonal members 8 and 9.

Figure 5:
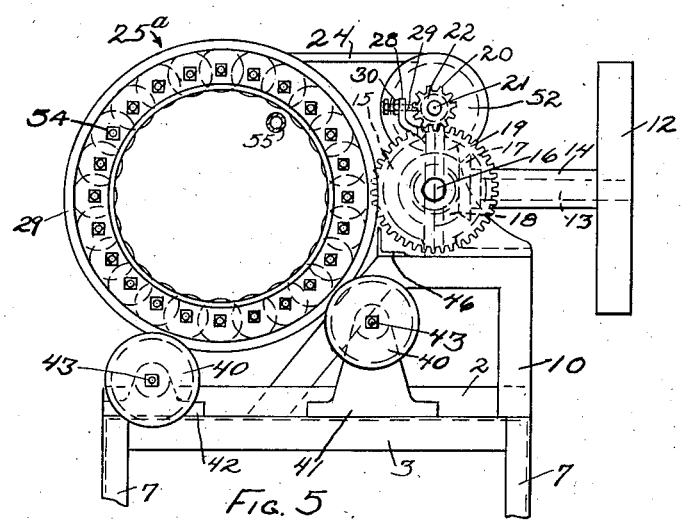
Figure 5 is a view of the discharge end of the said machine with the discharge spout removed.

The said machine is driven by means of belt pulley 12 keyed to shaft 13 journalled in bracket 14 (see Figure 5). Shaft 13 drives a shaft 16 journalled in brackets 14 and 15 by means of intermediate gears 17 and 18. Gear 19 is keyed to said shaft 16 and is in meshing relation with gear 20 keyed to shaft 21 journalled in bracket 22 (see Figure 2). Grooved pulleys 52 secured to the left hand end of shaft 21 drive pulleys 23 secured to peeling rolls in a manner hereinafter described by means of belts 24.

Figure 4:
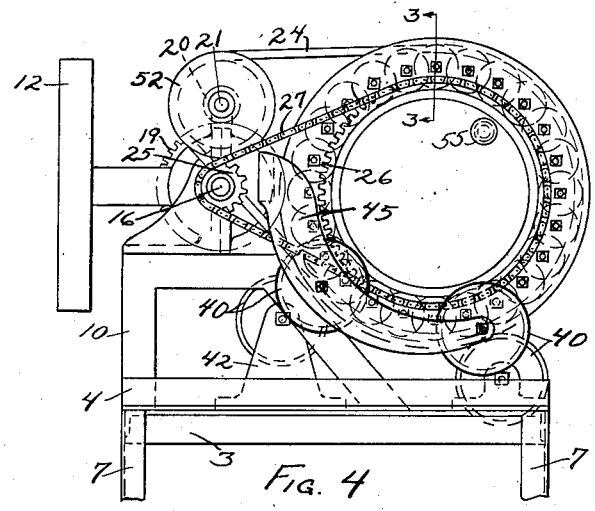
Figure 4 is a view of the feed end of the said machine with the feed hopper removed.

Chain sprocket 25 (see Figures 2 and 4) is keyed to the left hand end of shaft 16 and causes the peeling drum 25a to rotate by driving chain sprocket 26 by means of chain 27. Bracket 22 is rotatably mounted upon brackets 14 and 15. The tension upon belts 24 is regulated by means of adjusting screw 29 (see Figure 5).

Adjusting screw 29 is threaded in extending arm 28 of the bracket 15 and may be locked in any position by means of nut 30. When said adjusting screw 29 is forced against bracket 22, shaft 21 is moved away from the drum 25a thus increasing the tension in the belts 24. By reversing the said operation, the tension on belts 24 can be decreased even to such an extent that the removal of said belts is a simple and easy operation.

Figure 3:
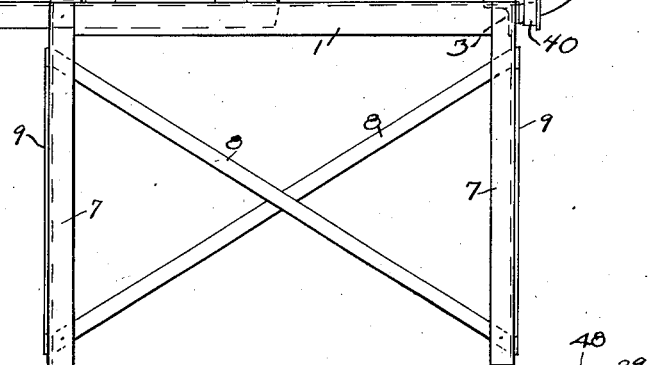
Figure 3 is a sectional view of one of the peeling rolls taken on line 3—3 of Figure 4 looking in the direction of the arrows.

The peeling drum is essentially a rotating cylinder with a series of rotating peeler rolls mounted upon its periphery (see Figures 1 and 3). The two end ring members 28 and 29 are secured and held in fixed relation by means of rods 30 and cap screws 54.

Rotatably mounted upon said rods 30 are sleeves 31 upon which are secured the peeling tools 32 and 33 and the pulleys 23. The peeling tools 32 and 33 may be made of an abrasive material or of a resilient substance such as rubber, depending for selection upon the character of vegetables or fruits to be peeled.

The peeling tools 32 and 33 are approximately spherical in the preferred form of the device illustrated, and arranged complementally in the wall of the drum, each tool filling the spaces between tools on adjacent sleeves 31.

The said tools 32 and 33 are slipped on to sleeve 31 and held secure and in fixed relation by means of sleeves 34, washers 37 and 48, pulleys 23 and nuts 36.

In Figure 3, the washers 48 are shown as secured to sleeves 31. The other members are free to rotate until they are all clamped by means of nuts 36 threaded upon the left hand ends of sleeves 31, thus causing these members to rotate with sleeves 31 about the rods 30.

A conventional form of pressure lubrication has been incorporated in the bearings at each end of rods 30 represented by fittings 38 and ducts 39. Sprocket 26 integrally secured to end ring 28 is driven by the heretofore described chain 27 providing means for rotating the peeling drum 25a.

Figure 2:
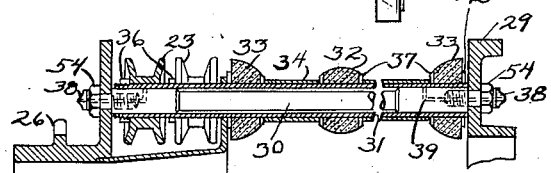
Figure 2 is a fragmentary side elevation with the peeling drum removed.

Drum 25a is rotatably mounted upon rollers 40 (see Figures 1 and 2). The two right rollers 40 are rotatably mounted upon brackets 41 and 42 by means of studs 43 (see Figure 5).

Brackets 41 and 42 are secured to the end transverse frame member 3. The left rollers 40 are rotatably mounted upon the supporting arm member 45 by means of studs 44 (Figure 2). The said supporting arms member 45 is secured in a conventional manner to drive support frame members 10 and 46. A conventional discharge spout 58 (see Figure 1) is secured to the transverse end frame member 3 by means of the supporting members 47.

In order to provide a means for flushing the vegetables and fruits during the peeling operation, pipe 55 (see Figures 1, 4 and 5) extending longitudinally through the drum 25a throws a constant spray of water upon the vegetables and fruits, through a series of apertures in its periphery. The flushing pipe 55 is secured to heretofore mentioned hopper supporting member 47 by means of clamp 56 and bolts 57.

Figure 6:
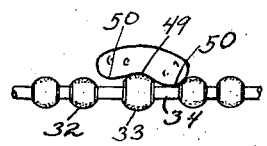
Figure 6 is a diagrammatical view illustrating the action of said machine on vegetables.

Figure 6 clearly illustrates the manner in which the present type of peeler can remove peelings at point 49 without removing an excess at points 50. The speed at which the peeling drum 25a revolves is such as to produce a tumbling motion to the vegetables or fruits therein, thus exposing all surfaces of the said vegetables or fruits the action of the peeling rolls and to prevent an excess removal of peelings at any point.

Water is constantly sprayed upon the vegetables or fruits in the drum during the peeling process. Such water causes a slippery film to be formed on the vegetables or fruits in the device lessening the friction therebetween. Such slippery state aided by the heretofore mentioned tumbling effect produced by the revolution of the peeling drum causes the vegetables or fruits to seek the lowest level they can maintain.

Due to such action, the points of highest contour reach the lowest points and the indentations or points of lowest contour are thus exposed to the ball like peeling tools enabling the low spots on the fruits and vegetables to be peeled without removing the pulp or body about the high spots to an excess.

The peeling rolls of the vegetable and fruit peeler may be easily removed without disturbing any of the other units of the machine by simple removing capscrews 54 shown in Figure 3. In this manner rolls of different degrees of abrasiveness may be selected to accommodate vegetables and fruits of different degree of firmness.

I claim:

1. A vegetable and fruit peeler comprising a plurality of horizontal shafts, and ball-like peeling members of different diameters selectively and complementally arranged for rotation with said horizontal shafts to provide a substantially unbroken bed with small spaces between said members, and means for rotating certain of said members relatively to other members within said bed.

2. A vegetable and fruit peeler comprising a drum having therein a plurality of ball-like peeling members of different diameters selectively and complementally arranged about the periphery thereof, means for rotating said drum, and means for rotating said peeling members at a peripheral speed different from the peripheral speed of said rotating drum.

3. A vegetable and fruit peeler comprising a rotating drum having therein a plurality of rotating ball-like peeler members of different diameters complementally arranged to provide a vegetable or fruit receiving bed, means for rotating the drum, and means for rotating a plurality of said peeler members at the same angular velocity during rotation of the drum.

4. A vegetable and fruit peeler comprising a rotating drum having a plurality of rotating ball-like peeler members of different diameters complementally arranged about the periphery thereof to provide a vegetable or fruit receiving bed, means for rotating said drum, and means for rotating the ball-like peeler members in the direction opposite of the rotation of the drum and at a greater peripheral speed than the peripheral speed of said drum.

5. A vegetable and fruit peeler comprising a rotatable cylindrical tunnel having a wall formed of a plurality of complementally arranged ball-like peeling members of different diameters disposed for independent rotation and providing a fruit or vegetable receiving bed, and means for rotating said members relatively to one another.

6. A vegetable and fruit peeler comprising a drum, a frame rotatably supporting said drum, a series of shafts extending longitudinally of and within the walls of said drum for rotation independently thereof, a plurality of ball-like peeler members of different diameters arranged complementally upon said shafts for rotation therewith and forming a fruit or vegetable received bed, and means for causing concurrent rotation of said drum and shafts.

7. A vegetable and fruit peeler comprising a cylindrical tunnel formed of a plurality of shafts arranged longitudinally of the tunnel and mounted for rotation independently thereof, ball-like peeler members of different diameters fixed in complemental arrangement upon said shafts for rotation therewith and forming a fruit or vegetable receiving bed, means for continuously flushing said tunnel, means for rotating said tunnel, and means for rotating said shafts to cause the peeler members on adjacent shafts to rotate relatively to one another during the rotation of said tunnel.

8. A vegetable and fruit peeler comprising a rotatable drum having walls of a plurality of shafts arranged longitudinally of said drum, rotatable ball-like peeler members of different diameters, ball-like peeler members upon said shafts in a selected complemental arrangement for rotation about the axes of their respective shafts and forming a bed to receive such fruit or vegetables, means for rotating said drum, and means for rotating said peeler members concurrently with the rotation of said drum.

9. A vegetable and fruit peeler comprising a group of horizontal parallel shafts, a plurality of ball-like peeler members of different diameters complementally arranged upon said shafts to provide a fruit and vegetable receiving bed, and means for rotating said shafts.

10. A vegetable and fruit peeler comprising a group of horizontal parallel rotatable shafts, a plurality of ball-like peeler members of different diameters arranged complementally upon said shafts to form a bed suitable to support a group of such vegetables and fruit, and means for rotating said shafts.

11. In a vegetable and fruit peeler, a rotating drum comprising spaced-apart shafts, each of said shafts having a plurality of peeling members of different diameters thereon for rotation therewith, the peeling members on each shaft being off-set from those on the shafts next adjacent thereto whereby the distance between the members upon the adjacent shafts is substantially the same at each transverse section, and means for rotating said drums and said shafts.

12. A vegetable and fruit peeler comprising a rotating drum having therein a plurality of ball-like peeler members selectively and complementally arranged to provide a fruit or vegetable receiving bed, means for rotating said drum, and means for rotating certain of said peeler members at a greater peripheral speed with respect to said drum than others and during rotation of said drum.

13. A vegetable and fruit peeler comprising a drum having its periphery defined by a plurality of shafts, each of said shafts having peeling members of different diameters thereon, the peeling members of one shaft being approximate the peeling members of an adjacent shaft, and means for rotating said drum and said shafts.

WILLIAM E. URSCHEL.